(12) United States Patent
Wofford et al.

(10) Patent No.: US 8,012,520 B2
(45) Date of Patent: Sep. 6, 2011

(54) PACKAGING PRODUCT, PROCESS FOR MAKING SAME, AND PRODUCT MADE THEREFROM

(75) Inventors: George Dean Wofford, Duncan, SC (US); Kimberly Ann Mudar, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 292 days.

(21) Appl. No.: 11/893,241

(22) Filed: Aug. 15, 2007

(65) Prior Publication Data
US 2008/0026117 A1   Jan. 31, 2008

Related U.S. Application Data

(62) Division of application No. 09/724,432, filed on Nov. 28, 2000, now abandoned, and a division of application No. 09/992,271, filed on Nov. 16, 2001, now Pat. No. 7,273,629.

(51) Int. Cl.
*B65B 25/06* (2006.01)
(52) U.S. Cl. .......... 426/129; 426/130; 426/127
(58) Field of Classification Search .......... 426/127, 426/129, 130
See application file for complete search history.

(56) References Cited

U.S. PATENT DOCUMENTS

| | | | |
|---|---|---|---|
| 3,355,313 A | 11/1967 | Eastes | 117/47 |
| 3,645,992 A | 2/1972 | Elston | |
| 3,650,775 A | 3/1972 | Simon et al. | |
| 3,673,041 A | 6/1972 | Schultz et al. | |
| 3,741,803 A | 6/1973 | Clayton | 161/247 |
| 4,059,667 A | 11/1977 | Pangonis | |
| 4,064,296 A | 12/1977 | Bornstein et al. | |
| 4,072,790 A | 2/1978 | Creekmore et al. | 428/220 |
| 4,120,716 A | 10/1978 | Bonet | |
| 4,188,443 A | 2/1980 | Mueller et al. | |
| 4,226,826 A | 10/1980 | Motegi et al. | |
| 4,278,738 A | 7/1981 | Brax et al. | |
| 4,335,069 A | 6/1982 | Levy | |
| 4,431,705 A | 2/1984 | Kitagawa et al. | |
| 4,448,792 A | 5/1984 | Schirmer | |
| 4,469,742 A | 9/1984 | Oberle et al. | |
| 4,544,722 A | 10/1985 | Giddings et al. | |
| 4,552,789 A * | 11/1985 | Winchell | 428/132 |

(Continued)

FOREIGN PATENT DOCUMENTS

EP   0 435 498 A2   3/1991

(Continued)

OTHER PUBLICATIONS

Wild, et al., "Determination of Branching Distributions in Polyethylene and Ethylene Copolymers", J. Poly. Sci. Phys. Ed., 982, 20, 441-455.

(Continued)

*Primary Examiner* — Rena L Dye
*Assistant Examiner* — Chaim Smith
(74) *Attorney, Agent, or Firm* — Rupert B. Hurley, Jr.

(57) ABSTRACT

A packaged product has a food product having an added liquid thereon, and a packaging article at least partially surrounding the food product. The packaging article having a seal layer comprising a member selected from the group consisting of a slip agent and a surfactant. The slip agent or surfactant causes contamination from the added liquid to bead up or wet out, respectively, thereby permitting heat sealing through the contamination with a lower leaker rate than would otherwise be the case.

22 Claims, 3 Drawing Sheets

U.S. PATENT DOCUMENTS

| | | |
|---|---|---|
| 4,617,241 A | 10/1986 | Mueller |
| 4,626,397 A | 12/1986 | Bose |
| 4,652,490 A | 3/1987 | Arita et al. |
| 4,680,207 A | 7/1987 | Murray |
| 4,755,402 A | 7/1988 | Oberle |
| 4,833,024 A | 5/1989 | Mueller |
| 4,863,784 A | 9/1989 | Lustig et al. |
| 4,871,561 A | 10/1989 | Parker |
| 4,879,430 A | 11/1989 | Hoffman |
| 4,941,938 A | 7/1990 | Karlson |
| 4,988,465 A | 1/1991 | Lustig et al. |
| 5,015,313 A * | 5/1991 | Drew et al. ............ 156/87 |
| 5,023,143 A | 6/1991 | Nelson |
| 5,206,075 A | 4/1993 | Hodgson, Jr. |
| 5,213,900 A | 5/1993 | Friedrich |
| 5,241,031 A | 8/1993 | Mehta |
| 5,256,428 A | 10/1993 | Lustig et al. |
| 5,272,236 A | 12/1993 | Lai et al. |
| 5,278,272 A | 1/1994 | Lai et al. |
| 5,328,743 A | 7/1994 | Wynne et al. |
| 5,443,769 A * | 8/1995 | Karabedian et al. ......... 264/46.1 |
| 5,632,843 A | 5/1997 | Lustig et al. |
| 5,635,261 A | 6/1997 | Georgelos et al. |
| 5,674,602 A * | 10/1997 | Karabedian et al. ....... 428/304.4 |
| 6,146,726 A | 11/2000 | Yoshii et al. |
| 6,355,287 B2 | 3/2002 | Noel et al. |
| 6,372,274 B2 | 4/2002 | Noel et al. |

FOREIGN PATENT DOCUMENTS

| | | |
|---|---|---|
| EP | 0 707 957 A1 | 4/1996 |
| EP | 0 756 931 A2 | 2/1997 |
| GB | 2 206 890 A | 1/1989 |
| JP | 58 101133 A | 6/1983 |
| WO | 90/03414 | 4/1990 |
| WO | 93/03093 | 2/1993 |
| WO | 97/13640 | 4/1997 |
| WO | WO99/00250 | 1/1999 |
| WO | WO99/07553 | 2/1999 |

OTHER PUBLICATIONS

Ash, M. and I., Handbooks of Industrial Surfactants, Gower Publishing, 1997.

Injected Pork is a Winner, Bjerklie, M&S Merchandising, Mar./Apr. 1998, 2 pages.

* cited by examiner

PACKAGING PRODUCT, PROCESS FOR MAKING SAME, AND PRODUCT MADE THEREFROM

This is a divisional of application Ser. No. 09/724,432 filed of Nov. 28, 2000 now abandoned and pending application Ser. No. 09/992,271 filed on Nov. 16, 2001 now U.S. Pat. No. 7,273,629, each of which are hereby incorporated, in their entireties, by reference thereto.

FIELD OF THE INVENTION

The present invention relates to polymer films, processes for making the same, and products made therefrom. In particular, the present invention relates to the packaging of food products having added liquids.

BACKGROUND OF THE INVENTION

Injecting food products (e.g., meats, poultry) with liquid, such as brine, has been used as a means of tenderizing the food product. However, when the injected liquid interacts with the muscle proteins, a portion of the injected brine, along with dissolved muscle proteins and natural juices and blood from the meat product, exudes from the food product during packaging. The exuded liquid blend "contaminates" the packaging film in the region to be sealed, in the sense that the exuded liquid interferes with the making of a strong and hermetic heat seal. As a result, a high percentage of the seals leak during initial heat sealing, after 24 hours, and/or when the product is shipped and arrives at its final destination. As high as 80% of the seals may leak. The high number of leaking seals results in costly product waste, a need for repackaging of the food product, and an increased risk of product contamination.

Microscopic analysis of seal areas contaminated with liquid blend reveals dried, brittle salt-like crystals, which may act as a physical barrier to intermolecular polymer diffusion across the seal area during heat sealing. Careful analysis of the seal strength of these seals reveals that the strength can be reduced up to and sometimes greater than 80% as compared to that of uncontaminated seals. Further, seal strength testing reveals that contaminated seals fail at the contaminated seal interface, while uncontaminated seals typically show failures outside of the seal area. Thus, the structural integrity of the packaging material is significantly limited by the contaminant in the seal area. The inherent strength of the packaging material no longer matters, as the contaminated seal becomes the "weak link".

Some meat processors have circumvented the problem of high leaking seal rates by modifying the equipment used to package the food product. In particular, the platforms carrying the unsealed injected meat product in the packaging article are tilted to allow the liquid to slide off of the seal area and back into the meat product area. However, modifying the equipment is costly and does not provide a packaging material supplier with a competitive advantage.

Another solution to this problem of high seal failure rates is to provide an oversized packaging article. In this way, the seal can be made at a greater distance from the meat product thereby reducing the likelihood of contaminating the seal area. In addition, after sealing, there is less stress applied to the seal area from the meat product, particularly during abusive handling operations (e.g., packing the product in boxes or transporting the product). However, the resulting packaged product has reduced appearance or aesthetic value, since excess packaging material extends outward from the product. Also, the excess film provides an area where liquid collects, which is unsightly and can cause accelerated spoilage rates for the food product.

In light of the foregoing, it would be desirable to provide a packaging article having hermetic seals which exhibit fewer leaks and/or greater seal strength in the packaging of a food product having an added liquid. The article should also be inexpensive to produce and aesthetically pleasing.

SUMMARY OF THE INVENTION

It has been found that when packaging a meat product having an added liquid, it is advantageous to cause the added liquid contamination to bead up on the seal layer of the film, or to wet out on the seal layer of the film. The resulting heat seal through the contamination exhibits a lower leaker rate. The film can be provided with a slip agent, such as a wax, to cause the contamination to bead up. Alternatively, the film can be provided with a surfactant on the seal layer, to cause the contamination to wet out, i.e., thin out, on the surface of the film. Providing the seal layer with either a slip agent or a surfactant results in the ability to thereafter heat seal through the contamination so that leaker rates are lowered compared with the absence of either a slip agent or a surfactant.

As a first aspect, the present invention is directed to a packaged product comprising a food product having an added liquid thereon. A packaging article at least partially surrounds the food product having the added liquid. The packaging article having a seal layer comprising a member selected from the group consisting of a slip agent and a surfactant. Preferably, the seal layer comprises the slip agent in an amount of from about 300 to 6000 ppm; more preferably, from about 600 to 4500 ppm; more preferably, from about 1200 to 3000 ppm.

Preferably, the slip agent comprises a fatty amide, and the surfactant comprises a non-ionic surfactant. Preferably, the slip agent comprises a primary fatty amide, and the surfactant comprises at least one member selected from the group consisting of sorbitan oleate and alkyl-phenol.

Preferably, the seal layer contains a heterogeneous ethylene/alpha-olefin copolymer having a density of from about 0.85 to 0.95 g/cc; more preferably from 0.87 to 0.93 g/cc; more preferably, from 0.89 to 0.915 g/cc. Preferably, the heterogeneous ethylene/alpha-olefin copolymer has a melt index of from about 0.1 g/10 min to about 20 g/10 min; more preferably, from about 2 to 10 g/10 min; more preferably, from about 4 to 8 g/10 min.

Preferably, the seal layer contains a homogeneous ethylene/alpha-olefin copolymer having a density of from about 0.85 to 0.95 g/cc; more preferably, from about 0.87 to 0.92 g/cc; more preferably, from about 0.89 to 0.91 g/cc. Preferably, the homogeneous ethylene/alpha-olefin copolymer has a melt index of from about 0.1 g/10 min to about 20 g/10 min; more preferably, from about 2 to 12 g/10 min; more preferably, from about 4 to 8 g/10 min. As referred to herein herein, melt index is determined in accordance with ASTM D 1238, which is hereby incorporated, in its entirety, by reference thereto.

Preferably, the seal layer is free of antiblock particulates on the surface thereof.

Preferably, the seal layer has an outer surface having surfactant thereon, the surfactant being present in an amount of from about 0.5 to 500 µg/in$^2$; more preferably, from about 1 to 250 µg/in$^2$; more preferably, from about 2 to 100 µg/in$^2$.

In one preferred embodiment, the film preferably has a total free shrink of from 10 to about 150 percent at 185° F.; more preferably, from about 20 to 120 percent; more preferably, from about 30 to 120 percent. In an end seal bag in accordance with the present invention, preferably the free shrink in the transverse direction is greater than the free shrink in the machine direction. In a side seal bag in accordance with the present invention, preferably the free shrink in the longitudinal direction is greater than the free shrink in the transverse direction. Preferably, the heat-shrinkable character of the film is achieved by orienting the film in the solid state.

In another preferred embodiment, the film preferably has a total free shrink of less than 10 percent at 185° F. Preferably, this film is made as a "blown film", i.e., polymer orientation in the film is achieved by orienting the polymer while it is in the molten state, or by casting the film.

In one embodiment, the packaging article preferably comprises a film having the seal layer, the film having a thickness of from about 0.1 to 20 mils; more preferably, from about 0.5 to 10 mils; more preferably, from about 1.5 to 5 mils.

In another embodiment, the packaging article preferably comprises a sheet having the seal layer, the sheet having a thickness of from about 5 to 600 mils. In one version, the sheet is preferably a rigid non-foam sheet having a thickness of from about 5 to 200 mils; more preferably, from about 10 to 60 mils. In another version, the sheet is preferably a foam sheet having a thickness of from about 50 to 400 mils; more preferably, from about 100 to 150 mils.

Preferably, the food product comprises at least one member selected from the group consisting of meat and cheese. If meat is present, preferably, the meat comprises at least one member selected from the group consisting of pork and beef; more preferably, brine injected pork.

Preferably, the added liquid comprises brine. Preferably, the added liquid is present in an amount of from about 1 percent to 50 percent, based on the weight of the product; more preferably, from about 2 to 40 percent; more preferably, from about 2 to 30 percent; more preferably, from about 3 to 20 percent; and more preferably, from about 7 to 12 percent.

Preferably, the seal layer comprises at least one member selected from the group consisting of polyolefin, polyamide, polyester, polyvinyl chloride, and ionomer.

As a second aspect, the present invention is directed to a packaged product comprising a food product having an added liquid thereon, and a packaging article at least partially surrounding the food product and the added liquid, the packaging article comprising a seal layer having a surface energy of 28 dynes/cm or less; more preferably, 26 dynes/cm or less; more preferably, 24 dynes/cm or less; more preferably, 22 dynes/cm or less; more preferably, 20 dynes/cm or less; preferably, from about 16 to 28 dynes/cm; more preferably, from about 16 to 26 dynes/cm; more preferably, from about 16 to 24 dynes/cm. Alternatively, the seal layer has a surface energy of at least 32 dynes/cm; more preferably, at least 34 dynes/cm; more preferably, at least 36 dynes/cm; more preferably, at least 38 dynes/cm; more preferably, at least 40 dynes/cm; preferably, from about 32 to 50 dynes/cm; more preferably, from about 32 to 46 dynes/cm; and more preferably, from about 32 to 42 dynes/cm. Preferred packaged products in accordance with the second aspect of the present invention are otherwise in accordance with the first aspect of the present invention.

DETAILED DESCRIPTION OF THE INVENTION

Figure 1:
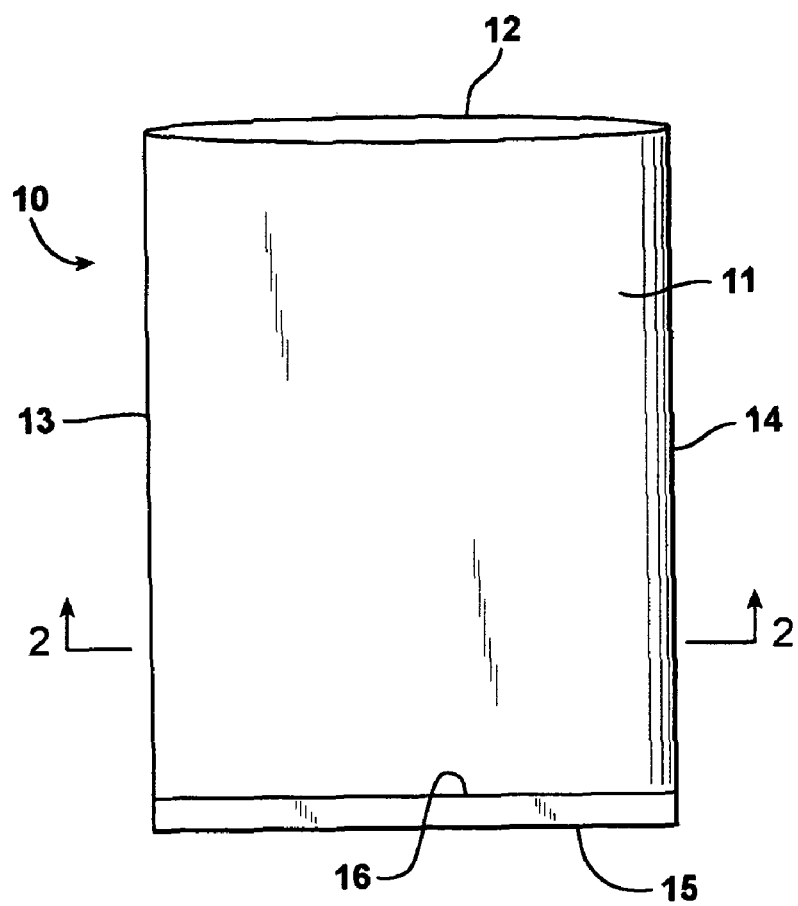
FIG. 1 illustrates an end-seal bag in lay-flat view, the bag being useful in a packaged product according to the present invention.

The phrase "packaging article", as used herein, refers to an article which is used to at least partially surround a product being packaged. Packaging articles include both flexible packaging films and rigid packaging members such as trays, both non-foamed (i.e., rigid) and foamed.

The term "film" is used herein in a generic sense to include plastic web, regardless of whether it is film or sheet.

As used herein, the phrases "seal layer", "sealing layer", "heat seal layer", and "sealant layer", refer to an outer layer, or layers, involved in the sealing of the film to itself, another layer of the same or another film, and/or another article which is not a film. Although it should also be recognized that up to the outer 3 mils of a film can be involved in the sealing of the film to itself or another layer, the phrase "seal layer," and the like, refer herein only to the outer layer(s) which is to be heat-sealed to itself, another film, etc. Any inner layers which contribute to the sealing performance of the film are herein designated as "seal-assist" layers. With respect to packages having only fin-type seals, as opposed to lap-type seals, the phrase "sealant layer" generally refers to the inside layer of a package, the inside layer being an outer layer which frequently also serves as a food contact layer in the packaging of foods. However, in a multilayer film, the composition of the other layers (within 3 mils of the inside surface) can also affect sealability and seal strength.

As used herein, the term "heat-seal," and the phrase "heat-sealing," refer to any seal of a first region of a film surface to a second region of a film surface, wherein the seal is formed by heating the regions to at least their respective seal initiation temperatures. The heating can be performed by any one or more of a wide variety of manners, such as using a heated bar, hot wire, hot air, infrared radiation, ultrasonic sealing, etc. Heat-sealing is the process of joining two or more thermoplastic films or sheets by heating areas in contact with each other to the temperature at which fusion occurs, usually aided by pressure. Heat-sealing is inclusive of thermal sealing, melt-bead sealing, impulse sealing, dielectric sealing, and ultrasonic sealing.

In one embodiment, the polymer in the seal layer is selected from the group consisting of thermoplastic polyolefins, polyamides, polyesters, polyvinyl chlorides, and ionomers. Preferred polymers for the sealant layer include homogeneous ethylene/alpha-olefin copolymer, heterogeneous ethylene/alpha-olefin copolymer, ethylene/unsaturated ester copolymer (especially ethylene/vinyl acetate copolymer), and ionomer. Preferably, the seal layer comprises homogeneous ethylene/alpha-olefin copolymer in an amount of at least about 50 weight percent, more preferably at least about 70 weight percent, and still more preferred at least about 80 weight percent. A particularly preferred seal layer comprises homogeneous ethylene/alpha-olefin (EAO) copolymer in an amount of at least 50 percent, based on layer weight, preferably in combination with a different polyethylene homopolymer or copolymer, such as linear low density polyethylene and/or low density polyethylene. In one particular embodiment, the polymer is a single-site catalyzed ethylene/alpha-olefin copolymer. For example, the polymer can be a copolymer of ethylene and one or more alkenes. Suitable alkenes include, but are not limited to butene, hexene, and octene. Other polymers which are useful in the seal layer include ethylene/unsaturated ester copolymer (e.g., ethylene/vinyl acetate copolymer), and ethylene/unsaturated acid copolymer.

As used herein, the term "polymer" refers to the product of a polymerization reaction, and is inclusive of homopolymers, copolymers, terpolymers, etc. A film layer can consist of a single polymer (with or without non-polymeric additives), or can have still additional polymers together therewith, i.e., blended therewith.

As used herein, the term "homopolymer" is used with reference to a polymer resulting from the polymerization of a single monomer, i.e., a polymer consisting essentially of a single type of mer, i.e., repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene. The term copolymer is also inclusive of polymers produced by reaction, such as graft copolymer, block copolymer, and random copolymer.

As used herein, the term "polymerization" is inclusive of homopolymerizations, copolymerizations, terpolymerizations, etc., and includes all types of copolymerizations such as random, graft, block, etc. Polymers in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers to result in a copolymer. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER™ linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers maybe characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally have ($M_w/M_n$) of less than 2.7; preferably from about 1.9 to about 2.5; more preferably, from about 1.9 to about 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar 15 comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLD-PEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p. 441 (1982). Preferably, the homogeneous ethylene/alpha-olefin copolymers have a CDBI greater than about 70%, i.e., a CDBI of from about 70% to about 99%. The homogeneous ethylene/alpha-olefin copolymers in the multilayer films to be used in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to about 105° C. Preferably the homogeneous copolymer has a DSC peak $T_m$ of from about 80° C. to about 100° C. As used herein, the phrase "essentially single melting point" means that at least about 80%, by weight, of the material corresponds to a single $T_m$ peak at a temperature within the range of from about 60° C. to about 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can be prepared by the copolymerization of ethylene and any one or more alpha-olefins. Preferably, the alpha-olefin is a $C_3$-$C_{20}$ alpha-monoolefin, more preferably, a $C_4$-$C_{12}$ alpha-monoolefin, still more preferably, a $C_4$-$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, U.S. Pat. No. 5,241,031, and PCT International Application WO 93/03093, each of which is hereby incorporated by reference in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference in their entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference in their entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/unsaturated ester copolymer, ethylene/unsaturated acid copolymer, (especially ethyl acrylate copolymer, ethylene/butyl acrylate copolymer, ethylene/methyl acrylate copolymer, ethylene/acrylic acid copolymer, ethylene/methacrylic acid copolymer), modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "ethylene/alpha-olefin copolymer" refers to such heterogeneous materials as linear low density polyethylene (LLDPE), and very low and ultra low density polyethylene (VLDPE and ULDPE); and homogeneous polymers such as metallocene-catalyzed EXACT™ linear homogeneous ethylene/alpha olefin copolymer resins obtainable from the Exxon Chemical Company, of Baytown, Tex., and TAFMER™ linear homogeneous ethylene/alpha-olefin copolymer resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY™ resins, are also included as another type of homogeneous ethylene/alpha-olefin copolymer useful in the present invention.

The ethylene/alpha-olefin copolymer comprises a copolymer resulting from the copolymerization of from about 80 to about 99 weight percent ethylene and from 1 to about 20 weight percent alpha-olefin. Preferably, the ethylene/alpha-olefin copolymer comprises a copolymer resulting from the copolymerization of from about 85 to about 95 weight percent ethylene and from about 5 to about 15 weight percent alpha-olefin.

In one preferred embodiment, the seal layer comprises a slip agent, preferably in the absence of a surfactant. Without being bound by theory, it is believed that the slip agent is incompatible with the polymer that comprises the seal layer, and thus migrates to the surface of the sealing layer. The migration of the slip agent to the surface of the sealing layer causes a reduction in the surface energy of the polymer. When a contaminant (e.g., injected liquid solution) comes in contact with this lower surface energy sealing surface, the contaminant beads up more so than it would without the presence of the slip agent. In other words, there is less of a chemical affinity between the sealing layer and the contaminant, allowing the contaminant to be more easily squashed out or eliminated from the seal area. Accordingly, when a slip agent is used, the sealing surface preferably has a surface energy of less than about 28 dynes/cm, and more preferably less than 26, 24, 22, or 20 dynes/cm.

In one preferred embodiment, the slip agent is a fatty amide. Suitable fatty amides include, but are not limited to, primary fatty amides (e.g., unsubstituted monoamides), secondary or tertiary fatty amides (e.g., substituted monoamides including fatty alkanolamides), and fatty bisamides (e.g., substituted bisamides). In one particular embodiment, the primary fatty amides have 6-24 carbon atoms and are of the general structure R—C—O—$NH_2$. Particular examples of primary fatty amides include, but are not limited to, the following:

| Name | R = | Chemical name |
|---|---|---|
| Erucamide | $C_{21}H_{41}$ | cis-13-docosenamide |
| Behenamide | $C_{21}H_{43}$ | docosanamide |

Other suitable slip agents are:

| Name | R = | Chemical name |
|---|---|---|
| Oleamide | $C_{17}H_{33}$ | cis-9-octadecenamide |
| Lauramide | $C_{11}H_{23}$ | dodecanamide |
| Stearamide | $C_{17}H_{35}$ | octadecanamide |

An example of a fatty bisamide suitable for use in the present invention is N,N'-ethylene bis-stearamide. Further examples of suitable fatty amides can be found in Fatty Amides, by Arthur L. McKenna (Witco Chemical Corporation, 1982), which is incorporated by reference in its entirety. Other slip agents that could be used include:
  1) other long chain alkyl derivatives, e.g.,
    a. fatty acids (e.g., stearic acid)
    b. fatty ester synthetic waxes (e.g., hydrogenated castor oil)
    c. fatty acid metal salts (e.g., zinc stearate)
  2) natural waxes, e.g.,
    a. petroleum wax (e.g., microcrystalline wax, paraffin wax)
    b. vegetable wax (e.g., carnuba wax)
    c. animal wax (e.g., spermaceti wax)
    d. cellulose derivatives (e.g., cellulose acetate)
    e. polysaccharides (e.g., sodium alginate)
  3) synthetic lubricants, e.g.,
    a. silicones (e.g., polydimethylsiloxane)
    b. fluorocarbons (e.g., polytetrafluoroethylene)
    c. fluoropolymers (e.g., polyfluoroacrylate)
    d. polyolefins (e.g., polyethylene wax)
  4) fluorinated compounds, e.g.,
    a. fluorinated fatty acids and alcohols (e.g., perfluorolauric acid).

When a slip agent is utilized, the sealing layer also optionally comprises an antiblocking agent, such as corn starch, potato starch, and/or tapioca starch. The antiblocking agent is utilized to assist in processing during extrusion and/or orientation, and also to assist in converting operations thereafter.

When used, the slip agent is preferably present in an amount of from about 300 ppm to about 6000 ppm, based on the total weight of the seal layer, more preferably from about 600 ppm and about 4500 ppm, and most preferably from about 1200 ppm to about 3000 ppm.

The slip agent can be incorporated into the seal layer using any of a variety of conventional techniques. For example, the slip agent can be blended and extruded directly into the polymer of the seal layer. Alternatively, the slip agent can be sprayed or coated onto the seal layer.

In another embodiment, the seal layer comprises a surfactant, preferably in the absence of a slip agent. Generically surfactants are materials that are present on surfaces, as a result of having both lipophilic (fat-attracting) and lipophobic (polar or aqueous-attracting) components. The presence of a surfactant on the surface of the sealing layer is expected to result in the alteration of the interfacial or surface energy (or surface tension) of the surface. Surface tension is the attractive force exerted by molecules below the surface (here, the polymer and any optional additives) upon molecules at the surface-air interface (here, the contaminant). Without being bound by theory, it is believed that the surfactant acts to increase the surface tension of the sealing layer thereby creating an inward pull or internal pressure in the contaminant on the surface of the sealing layer. The internal pressure is expected to cause the contaminant to "wet out" or spread on the surface of the sealing layer, thereby allowing the injected liquid contaminant to be more easily squashed out or eliminated from the seal area. Accordingly, when a surfactant is used, the outer surface of the seal layer has a surface energy of greater than 32 dynes/cm, more preferably at least 34, 36, 38, 40, or 42 dynes/cm. Preferably, the surface energy is from 32 to 50 dynes/cm, more preferably from 32 to 46, or from 32 to 42 dynes/cm.

Surface energy can be determined by the Wilhelmy Plate Method (also known as the Wilhelmy Slide Method), as set forth in Chan, C. M., "Polymer Surface Modification and Characterization", pages 59-62, Hanser Publishers (1993), which is hereby incorporated, in its entirety, by reference thereto. The Wilhelmy Plate Method can be carried out using a Cahn Dynamic Contact Angle Analyzer DCA 315. Dynamic contact angle results can be further analyzed to obtain surface energy via geometrical mean analysis as set forth in Chan (above) at pages 42-44.

Suitable surfactants for use in the present invention include non-ionic surfactants (e.g., sorbitan oleates such as monoglycerides, diglycerides, triglycerides, and/or propylene glycol; and alkyl-phenol ethoxylates such as ethoxylated nonyl-phenol); anionic surfactants (e.g., sodium lauryl sulfate); cationic surfactants (e.g., cocamine, lauramine); and amphoteric surfactants (e.g., imidizoline derivatives, betaines, sulfobetaines, amino acid derivatives, lecithin, and related phospatides). Further examples of suitable surfactants can be found in Michael and Irene Ash, Handbooks of Industrial Surfactants, Gower Publishing (1997), which is incorporated herein by reference in its entirety.

In one embodiment, the surfactant used contains little (i.e., less than about 10 $\mu g/in^2$ of film area) or essentially no, antiblocking particulates such as starches (e.g., corn, potato, tapioca, etc.). The absence of antiblocking particulates is suspected to further assist in sealability, by preventing an increase in viscosity of any contaminant present on the surface of the sealing layer. The increased viscosity in the presence of corn starch, for example, is believed to result when the injected liquid contaminant and/or meat purge mixes with the corn starch to produce a paste-like substance. The elimination of this paste-like substance further improves the potential for good sealability.

When used, the surfactant is preferably present in an amount of between about 0.5 and about 500 $\mu g/in^2$, more preferably between about 1.0 and about 250 $\mu g/in^2$, and most preferably between about 2.0 and 100 $\mu g/in^2$.

The surfactant can be applied to the polymer using any of a variety of conventional techniques. For example, the surfactant can be applied to the polymer by a wet sock process during quenching, where the surfactant is contained inside the quenched tubular-shaped polymer by a set of pinch rollers. Alternatively, the surfactant can be applied to the polymer by spraying or coating. The surfactant can also be compounded directly into or onto the polymer.

The film may optionally comprise additional layers. Examples of such layers traditionally used include, but are not limited to, barrier layers, abuse or puncture-resistant layers, core layers, tie layers, bulk layers, food-contact or meat-contact layers, and other such "seal assist" layers. Preferably, the film according to the present invention comprises a total of from 3 to 20 layers; more preferably, from 4 to 12 layers; and still more preferably, from 5 to 9 layers. The film of the present invention can have any total thickness desired, so long as the film provides the desired properties for the particular packaging operation in which the film is used, and especially low seal failure rates or high contaminated burst strengths.

As used herein, the term "barrier," and the phrase "barrier layer," as applied to films and/or layers, is used with reference to the ability of a film or layer to serve as a barrier to one or more gases. In the packaging art, oxygen (i.e., gaseous $O_2$) barrier layers have included, for example, ethylene/vinyl alcohol copolymer, polyvinylidene chloride (PVDC), polyalkylene carbonate, polyamide, polyethylene naphthalate, polyester, polyacrylonitrile, etc., as known to those of skill in the art. However, in the present invention the $O_2$-barrier layer preferably comprises either EVOH or polyvinylidene chloride, the PVDC comprising a thermal stabilizer (i.e., HCl scavenger, e.g., epoxidized soybean oil) and a lubricating processing aid, which, for example, comprises one or more acrylates.

As used herein, the phrases "abuse layer", as well as the phrase "puncture-resistant layer", refer to any layer which serves to resist abrasion, puncture, and other potential causes of reduction of package integrity, as well as potential causes of reduction of package appearance quality. As used herein, the phrase "skin layer" refers to an outside layer of a multilayer film in packaging a product, this skin layer being subject to abuse.

As used herein, the term "core", and the phrase "core layer", as applied to multilayer films, refer to any internal layer which preferably has a function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "tie layer" refers to any internal layer having the primary purpose of adhering two layers to one another. In one preferred embodiment, tie layers can comprise any polymer having a polar group grafted thereon, so that the polymer is capable of covalent bonding to polar polymers such as polyamide and ethylene/vinyl alcohol copolymer. Preferred polymers for use in tie layers include, but are not restricted to, ethylene/unsaturated acid copolymer, ethylene/unsaturated ester copolymer, anhydride-grafted polyolefin, polyurethane, and mixtures thereof.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film.

As used herein, the phrases "food-contact layer" and "meat-contact layer", refer to a layer of a multilayer film which is in direct contact with the food/meat in the package comprising the film. The food-contact/meat-contact layer is an outer layer of the multilayer film, in the sense that the food-contact/meat-contact layer is in direct contact with the meat product within the package. The food-contact/meat-contact layer is an inside layer in the sense that with respect to the packaged food product/meat product, the food-contact/meat-contact layer is the inside layer (i.e., innermost layer) of the package, this inside layer being in direct contact with the food/meat.

As used herein, the phrase "food-contact surface" and "meat-contact surface" refers to an outer surface of a food-contact layer/meat-contact layer, this outer surface being in direct contact with the food/meat within the package.

At least a portion of the multilayer film of the present invention is preferably irradiated to induce cross-linking. In the irradiation process, the film is subjected to one or more energetic radiation treatments, such as corona discharge, plasma, flame, ultraviolet, X-ray, gamma ray, beta ray, and high energy electron treatment, each of which induces cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for cross-inking the polymer present in the film.

To produce cross-lining, a suitable radiation dosage of high energy electrons is employed, preferably using an electron accelerator, with a dosage level being determined by standard dosimetry methods. Other accelerators such as a Van de Graaf or resonating transformer may be used. The radiation is not limited to electrons from an accelerator since any ionizing radiation may be used. The ionizing radiation can be used to cross-link the polymers in the film. Preferably, the film is irradiated at a level of from about 30 kGy to about 207 kGy, more preferably from about 30 kGy to about 140 kGy, more preferably from 30 to 120 kGy, more preferably from 40 to 100 kGy, and more preferably from 50 to 80 kGy. As can be seen from the descriptions of preferred films for use in the present invention, the most preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto. BONET discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material. The films of this invention can be corona-treated in a preferred embodiment.

The present invention further relates to a packaging material comprising a film of the type described above. The film is preferably formed as a bag, a pouch, or a casing made from a flexible packaging film, i.e., a film tubing. In particular, the film can be formed as end-seal bags or side-seal bags. Further, the casing can be a seamless casing or a backseamed casing, the latter being a casing having a seam running the length of the tubing. Backseamed casings include both lap-seal backseamed casings as well as butt-sealed backseamed casings, the latter utilizing a butt-seal tape which is sealed to the casing film, as is known to those of skill in the art. When the packaging material is formed as a pouch, the packaging material is generally made from two rectangular pieces of flexible packaging film of the same dimensions, which are sealed to one another along 3 edges, leaving the unsealed fourth edges to form the open top, into which a product can be inserted.

In addition, the present invention relates to a packaged product comprising a food product that is at least partially surrounded by a film of the type described above. In one embodiment, the food product is selected from the group consisting of meat, poultry, fish, cheese, and combinations thereof. The food product can be bone-in or boneless.

The food product optionally comprises an added or injected liquid. As used herein, the phrases "added liquid" and "injected liquid" refer to any liquid which is added to the food product, i.e., to the surface of the food product and/or within the structure of the food product. Examples of added liquids include brine, spice solutions, etc., which are injected into meat products, or used as soaking solutions for cheese. Ultimately, a portion of the added liquid remains within the food product at the time of packaging, while another portion of the added liquid exudes onto the surface (or remains on the surface) of the food product at the time of packaging. It is this added liquid which is on the surface of the food product, i.e., not within the food product, which is available to contaminate the inside surface of the packaging article which is to be sealed. The added liquid which contaminates the inside surface of the packaging material is responsible for the lowering of the strength of the resulting seal. In the present invention, brine is a preferred added liquid. As used herein, the term "brine" is inclusive of a solution of salt (e.g. sodium chloride, sodium phosphate, etc) in water. Preferably, the brine contains salt in an amount of from about 1 to 50, more preferably from 2 to 35 percent, more preferably from 3 to 20 percent, based on the weight of the solution.

The present invention also relates to a process for packaging an article wherein a film of the type described above is formed into a packaging material having an opening. A food product is then placed into the packaging material through the opening and the opening is sealed. In one embodiment, the opening is heat sealed using conventional methods. Atmosphere is optionally evacuated from the packaging material just prior to, or during, the sealing of the opening. In one embodiment, the packaging material is heat shrunk around the food product.

As used herein, the phrases "heat shrunk," "heat-shrinkable," "heat-shrink," and the like, refer to the tendency of a film, generally an oriented film, to shrink upon the application of heat, i.e., to contract upon being heated, such that the size (area) of the film decreases while the film is in an unrestrained state. Likewise, the tension of a heat-shrinkable film increases upon the application of heat if the film is restrained from shrinking. In one particular embodiment of the present invention, the heat shrink film comprises a multilayer film having a free shrink at 185° F. of from about 15 to about 60 percent in at least one direction. Preferably, the free shrink in the transverse direction is at least about 110% of the free shrink in the machine direction. As a corollary, the phrase "heat-contracted" refers to a heat-shrinkable film, or a portion thereof, which has been exposed to heat such that the film or portion thereof is in a heat-shrunken state, i.e., reduced in size (unrestrained) or under increased tension (restrained).

Figure 2:
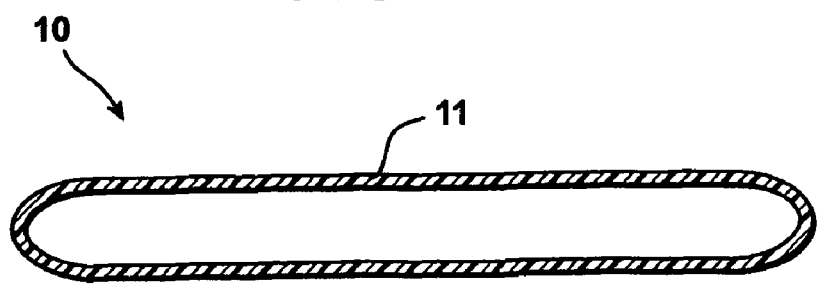
FIG. 2 illustrates a cross-sectional view taken through section 2-2 of FIG. 1.

FIG. 1 is a schematic of a preferred end seal bag 10, in a lay-flat position, this bag being in accord with the present invention; FIG. 2 is a cross-sectional view of bag 10 taken through section 2-2 of FIG. 1. Viewing FIGS. 1 and 2 together, bag 10 comprises bag film 11, top edge 12 defining an open top, first bag side edge 13, second bag side edge 14, bottom edge 15, and end seal 16.

Figure 3:
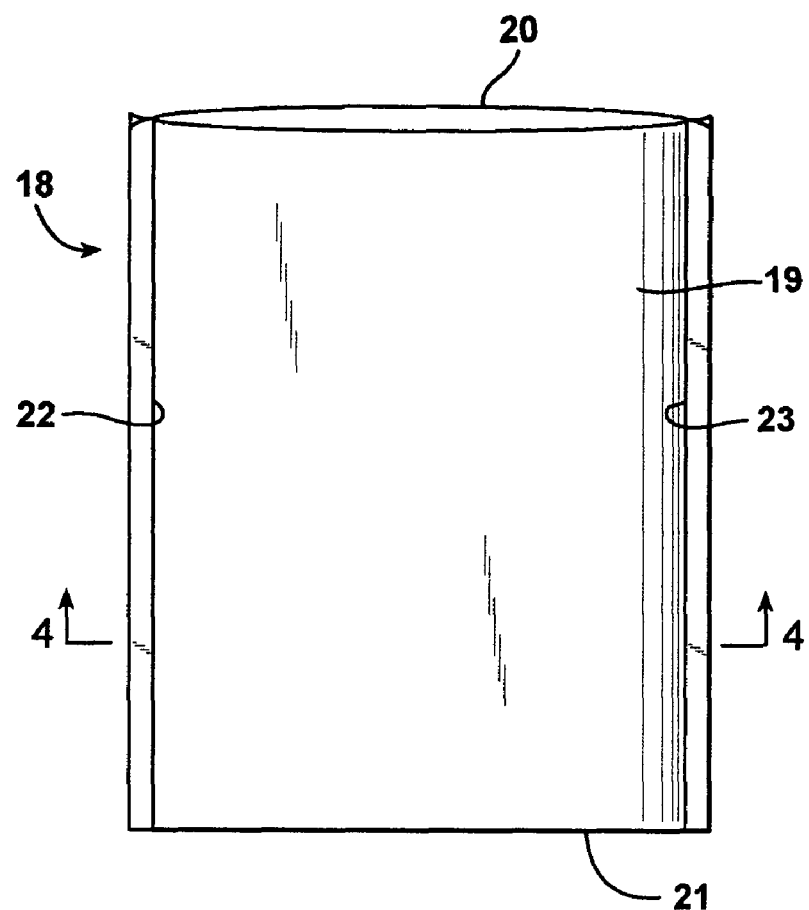
FIG. 3 illustrates a side-seal bag in lay-flat view, the bag being useful in a packaged product according to the present invention.
Figure 4:
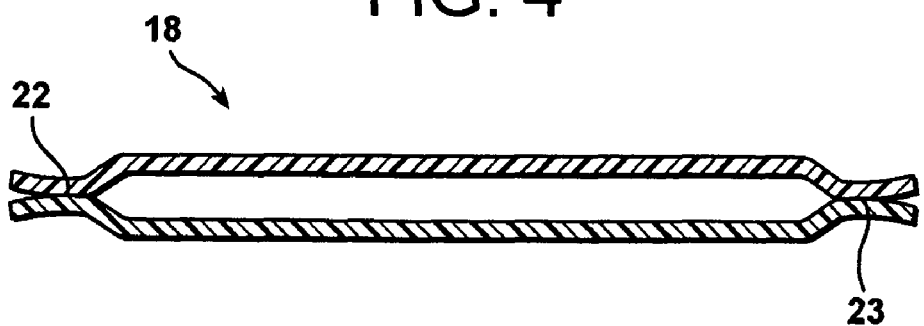
FIG. 4 illustrates a cross-sectional view taken through section 4-4 of FIG. 3.

FIGS. 3 and 4 illustrate side-seal bag 18. FIG. 3 illustrates a schematic of side seal bag 18, in a lay-flat view; FIG. 4 illustrates a cross-sectional view taken through section 44 of FIG. 3. With reference to FIGS. 3 and 4 together, side seal bag 18 is comprised of bag film 19, top edge 20 defining an open top, folded bottom edge 21, first side seal 22, and second side seal 23.

In addition to the bag-type packaging articles illustrated in FIGS. 1-4 and described above, the packaging article can also be a casing made from a flexible packaging film, i.e., a film tubing. The casing can be a seamless casing or a backseamed casing, the latter being a casing having a seam running the length of the tubing. Backseamed casings include both lap-seal backseamed casings as well as butt-sealed backseamed casings, the latter utilizing a butt-seal tape which is sealed to the casing film, as is known to those of skill in the art. Another type of packaging article which can be utilized is generally referred to as a "pouch," which is generally made from two rectangular pieces of flexible packaging film of the same dimensions, which are sealed to one another along 3 edges, leaving the unsealed fourth edges to form the open top, into which a product can be inserted.

Figure 5:
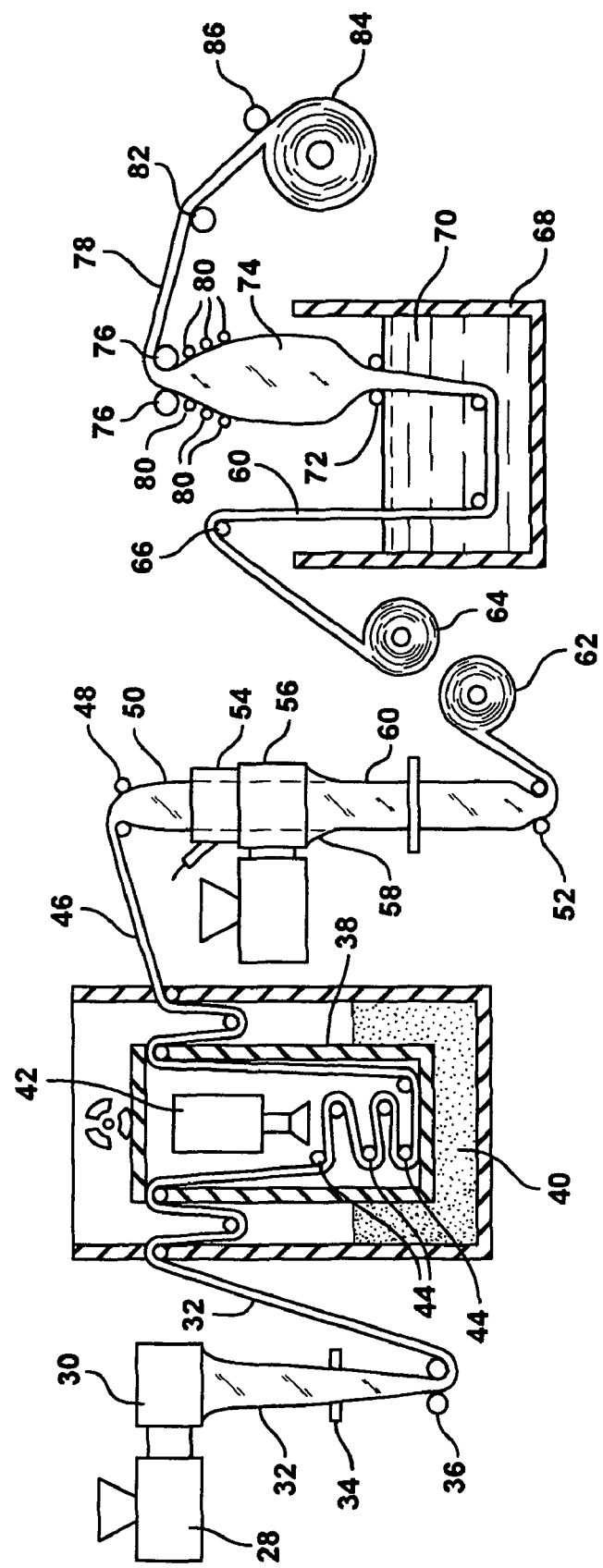
FIG. 5 illustrates a schematic view of a preferred process for making a multilayer film useful in the packaged product of the present invention.

FIG. 5 illustrates a schematic view of a first preferred process for making films according to the present invention. As illustrated in FIG. 5, solid polymer beads (not illustrated) are fed to a plurality of extruders 28 (for simplicity, only one extruder is illustrated). Inside extruders 28, the polymer beads are forwarded, melted, and degassed, following which the resulting bubble-free melt is forwarded into die head 30, and extruded through an annular die, resulting in tubing 32 which is preferably about 10 to 20 mils thick.

After cooling or quenching by water spray from cooling ring 34, tubing 32 is collapsed by pinch rolls 36, and is thereafter fed through irradiation vault 38 surrounded by shielding 40, where tubing 32 is irradiated with high energy electrons (i.e., ionizing radiation) from iron core transformer accelerator 42. Tubing 32 is guided through irradiation vault 38 on rolls 44. Preferably, tubing 32 is irradiated to a level of from about 40 kGy to about 120 kGy.

After irradiation, irradiated tubing 46 is directed through pinch rolls 48, following which irradiated tubing 46 is slightly inflated, resulting in trapped bubble 50. However, at trapped bubble 50, the tubing is not significantly drawn longitudinally, as the surface speed of nip rolls 52 are about the same speed as nip rolls 48. Furthermore, irradiated tubing 46 is inflated only enough to provide a substantially circular tubing without significant transverse orientation, i.e., without stretching.

Slightly inflated, irradiated tubing 46 is passed through vacuum chamber 54, and thereafter forwarded through coating die 56. Annular coating stream 58 is melt extruded from coating die 56 and coated onto slightly inflated, irradiated tube 50, to form two-ply tubular film 60. Coating stream 58 preferably comprises an $O_2$-barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 60 is wound up onto windup roll 62. Thereafter, windup roll 62 is removed and installed as unwind roll 64, on a second stage in the process of making the tubing film as ultimately desired. Two-ply tubular film 60, from unwind roll 64, is unwound and passed over guide roll 66, after which two-ply tubular film 60 passes into hot water bath tank 68 containing hot water 70. The now collapsed, irradiated, coated tubular film 60 is immersed in hot water 70 (preferably at a temperature of from about 185° F. to 210° F.) for a period of from about 10 to about 100 seconds, i.e., for a time period in order to bring the film up to the desired temperature for biaxial orientation.

Thereafter, irradiated tubular film 60 is directed through nip rolls 72, and bubble 74 is blown, thereby transversely stretching tubular film 60. Furthermore, while being blown, i.e., transversely stretched, nip rolls 76 draw tubular film 60 in the longitudinal direction, as nip rolls 76 have a surface speed higher than the surface speed of nip rolls 72. As a result of the transverse stretching and longitudinal drawing, irradiated, coated biaxially-oriented blown tubing film 78 is produced, this blown tubing preferably having been both stretched in a ratio of from about 1:1.5 to about 1:6, and drawn at a ratio of from about 1:1.5 to about 1:6; more preferably, the stretching and drawing are each performed a ratio of from about 1:2 to about 1:4. The result is a biaxial orientation of from about 1:2.25 to about 1:36, more preferably, from about 1:4 to about 1:16. While bubble 74 is maintained between pinch rolls 72 and 76, blown tubing 78 is collapsed by rollers 80, and thereafter conveyed through pinch rolls 76 and across guide roll 82, and then rolled onto wind-up roll 84. Idler roll 86 assures a good wind-up.

The invention is illustrated by the following examples, which are provided for the purpose of representation, and are not to be construed as limiting the scope of the invention. Unless stated otherwise, all percentages, parts, etc. are by weight.

EXAMPLES

Examples 1-16 of films in accordance with the present invention were prepared using an apparatus similar to that shown in FIG. 5 and described above. For comparison purposes, Comparative Examples A-H were also prepared. Specifically, three individual extruders 28 were utilized to form a three-layer coextruded quenched tape of 13-16 mils thickness. After being subject to electron beam irradiation at a dose level of 60-70 kGy, the tape was coated with coating stream 58, which consisted of a four-layer coextrusion of about 8 mils thick. The resulting seven-layer coextrusion was 21 to 24 mils thick. The coextruded tape was then heated in hot water and oriented to its final thickness of 1.8 to 2.2 mils. Individual layer thicknesses, layer percentages, and polymer compositions for each of Examples 1-16 are described in Tables 1-11 below.

TABLE 1

|  | Seal | Core | Tie | Barrier | Tie | Core | Outer |
|---|---|---|---|---|---|---|---|
| Thickness, pre-orientation (mil) | 5.0 | 9.0 | 1.0 | 2.0 | 1.0 | 3.0 | 2.0 |
| % of total thickness | 21.7 | 39.1 | 4.3 | 8.7 | 4.3 | 13.0 | 8.7 |
| Composition | See Table 2 | 80% LLDPE2 20% LLDPE3 | EVA1 | Barr1 | EMA1 | LLDPE2 | 85% ssPE3 15% LLDPE3 |

TABLE 1A

|  | Seal | Core | Barrier | Tie | Core | Outer |
|---|---|---|---|---|---|---|
| Thickness, pre-orientation (mil) | 5.0 | 8.4 | 2.2 | 1.0 | 3.0 | 1.5 |
| % of total thickness | 23.6 | 39.8 | 10.4 | 4.7 | 14.2 | 7.1 |
| Composition | See Table 2A | EVA1 | Barr1 | EMA1 | ssPE4 | 98% ssPE3 2% AB1 |

TABLE 1B

|  | Seal | Core | Tie | Barrier | Tie | Core | Outer |
|---|---|---|---|---|---|---|---|
| Thickness, pre-orientation (mil) | 5.5 | 9.1 | 1.0 | 2.2 | 0.8 | 3.9 | 1.3 |
| % of total thickness | 23.1 | 38.2 | 4.2 | 9.2 | 3.4 | 16.4 | 5.5 |
| Composition | See Table 2B | EVA2 | EVA1 | Barr1 | EVA3 | EVA3 | 90 EVA3 10 HDPE1 |

TABLE 2

| Example Number | Sealant Composition | Density (g/cc) | Melt Index (g/10 min) | Surface Modifying Additive | Anti-Blocking Agent |
|---|---|---|---|---|---|
| 1 | 80% ssPE1 20% Slip1 | 0.904 | 6.2 | Slip1 | corn starch |
| 2 | 80% ssPE1 20% Surf1 | 0.904 | 6.2 | Surf1 | corn starch |
| 3 | 80% ssPE1 20% LLDPE1 | 0.904 | 5.4 | Surf2 (wet sock) | — |
| 4 | 80% ssPE1 20% LLDPE1 | 0.904 | 5.4 | Surf3 (wet sock) | — |
| 5 | 80% ssPE2 20% Slip1 | 0.890 | 9.4 | Slip1 | corn starch |
| 6 | 75% ssPE1 20% LLDPE1 5% AB1 | 0.910 | 5.2 | Surf2 (wet sock) | — |
| 7 | 70% ssPE1 20% LLDPE1 10% AB1 | 0.916 | 4.9 | Surf2 (wet sock) | — |
| 8 | 90% ssPE2 10% AB1 | 0.880 | 9.2 | Surf2 (wet sock) | — |
| 9 | 90% ssPE1 10% Slip5 | 0.907 | 6.2 | Slip5 | corn starch |

TABLE 2-continued

| Example Number | Sealant Composition | Density (g/cc) | Melt Index (g/10 min) | Surface Modifying Additive | Anti-Blocking Agent |
|---|---|---|---|---|---|
| 10 | 85% ssPE1 15% Slip5 | 0.911 | 6.2 | Slip5 | corn starch |
| 11 | 92% ssPE1 8% Slip5 | 0.906 | 6.1 | Slip5 | corn starch |
| 12 | 96% ssPE1 4% Slip5 | 0.903 | 6.1 | Slip5 | corn starch |
| 13 | 98% ssPE1 2% Slip5 | 0.901 | 6.0 | Slip5 | corn starch |
| 14 | 90% ssPE2 10% Slip5 | 0.879 | 6.2 | Slip5 | corn starch |
| A | 80% ssPE1 20% LLDPE1 | 0.904 | 5.4 | None | Corn starch |
| B | 80% ssPE1 20% LLDPE1 | 0.904 | 5.4 | None | Corn starch |
| C | 80% ssPE1 20% LLDPE1 | 0.904 | 5.4 | None | Corn starch |
| D | 80% ssPE1 20% LLDPE1 | 0.904 | 5.4 | None | Corn starch |
| E | 80% ssPE1 20% LLDPE1 | 0.904 | 5.4 | None | Corn starch |
| F | 80% ssPE1 20% LLDPE1 | 0.904 | 5.4 | None | Corn starch |

TABLE 2A

| Example Number | Sealant Composition | Density (g/cc) | Melt Index (g/10 min) | Surface Modifying Additive | Anti-Blocking Agent |
|---|---|---|---|---|---|
| 15 | 95% ssPE1 5% Slip5 | 0.903 | 6.1 | Slip5 | Corn starch |
| G | 100% ssPE1 | 0.900 | 6.6 | None | Corn starch |

TABLE 2B

| Example Number | Sealant Composition | Density (g/cc) | Melt Index (g/10 min) | Surface Modifying Additive | Anti-Blocking Agent |
|---|---|---|---|---|---|
| 16 | 95% ssPE1 5% Slip1 | 0.903 | 6.0 | Slip1 | Corn starch |
| H | 80% ssPE1 20% LLDPE1 | 0.904 | 5.4 | None | Corn starch |

TABLE 3

| Abbreviation | Manufacturer | Grade | Density (g/cc) | Melt Index (g/10 min) | Description |
|---|---|---|---|---|---|
| ssPE1 | Dow | Affinity PL1280 | 0.900 | 6.0 | |
| ssPE2 | Dow | Affinity XU58380.01L | 0.870 | 10.0 | |
| ssPE3 | Dow | Affinity PL1850 | 0.902 | 3.0 | |
| ssPE4 | Dow | Affinity PF1140 | 0.897 | 1.6 | |
| LLDPE1 | Exxon | Escorene LL3003.32 | 0.918 | 3.2 | |
| LLDPE2 | Dow | Attane 4203 | 0.905 | 0.8 | |
| LLDPE3 | Dow | Dowlex 2045.03 | 0.920 | 1.0 | |
| LLDPE4 | Dow | Dowlex 2035 | 0.920 | 6.0 | |
| HDPE1 | Solvay | Fortiflex T60-500-119 | 0.961 | 6.2 | |
| EVA1 | Exxon | Escorene LD713.93 | 0.933 | 3.5 | Ethylene vinyl acetate copolymer (15% vinyl acetate) |
| EVA2 | Exxon | Escorene LD720.92 | 0.940 | 1.5 | Ethylene vinyl acetate copolymer (19% vinyl acetate) |
| EMA1 | Eastman | SP1305 | 0.944 | 2.0 | Ethylene methyl acrylate copolymer (20% methyl acrylate) |
| Barr1 | Dow | XU32034.06 | 1.69 | — | PVDC/MA copolymer |
| AB1 | Ampacet | 100610 | 1.05 | 2.0 | Antiblock masterbatch containing 20% talc in ssPE3 |
| AB2 | Kaopolite Inc | Kaopolite SFO | 2.63 | — | Anhydrous Aluminum Silicate |
| AB3 | Celite | Superfine Superfloss | 2.30 | — | Diatomaceous silica |

TABLE 3-continued

| Abbreviation | Manufacturer | Grade | Density (g/cc) | Melt Index (g/10 min) | Description |
|---|---|---|---|---|---|
| Slip1 | Cryovac | N/A | 0.96 | 6.9 | 89.376% LLDPE4<br>6.400% AB2<br>3.200% Slip2<br>0.768% Slip3<br>0.256% Slip4 |
| Slip2 | Witco | Kemamide W-40 | 0.995 | — | N,N'-ethylene-bis-stearamide |
| Slip3 | Witco | Kemamide E-Ultra | 0.851 | — | Erucamide |
| Slip4 | Witco | Kemamide B | 0.885 | — | Behenamide |
| Slip5 | Bayshore | FSU93E | 0.975 | 7.5 | 88% LDPE<br>9% AB3<br>3% Slip3 |
| Surf1 | Polyvel | VF151 | 1.0 | — | 80% LDPE + 20% monoglycerides |
| Surf2 | Witco | Atmos 300K special | 0.96 | — | 88% monoglycerides & diglycerides<br>12% propylene glycol |
| Surf3 | Henkel-Emery | Trycol 6961 | 1.02 | — | Polyethoxylated (4 moles) nonyl-phenol |

Contaminated burst pressure tests, standard drop tests, and/or in-line processing tests, and/or Surface Energy tests were conducted to characterize the sealability of packaging articles formed using the films of Examples 1-16. The results of the tests are presented below in Tables 4-11.

The contaminated burst test was conducted using a contaminant solution of brine and meat purge. The solution was prepared by combining 500 milliliters of a brine solution (which contained about 3 percent sodium phosphate), 500 milliliters of pork purge (predominantly blood) and 100 grams of lean pork muscle. This mixture was then blended for approximately 2 minutes until a uniform liquid consistency was achieved. A standard packaging article was used. The standard packaging article consisted of a bag, comprised of a tube of polymeric material having a factory seal applied to one end, and an open, unsealed end. The bag was about 9 in wide by 19 in long. Forty bags were tested for each formulation evaluated. Five to six milliliters of the contaminant solution contaminant solution was applied by pipette to the inside, open end of the bag, approximately 4 in from the open end. A seal was then applied to the open end of the bag using a Cryovac 8600-B18 rotary chamber vacuum packaging machine. The heat seal was made at the same location on the bag where the contaminant solution was applied. The sealing parameters that were utilized were: a current of 69-72 amps, a time of 0.5 seconds, and a machine speed of 30 packages per minute. The bags are then allowed to age for 48 hours prior to any further testing. The factory seal of each of the bags was then cut off to yield a bag with a length of about 14 inches. The bag was then collapsed to a lay-flat tube and the resulting open end was placed inside two horizontal pneumatic clamping jaws, composed of metal supports and rubber gaskets. An air injector nozzle was then placed inside of the bag opening. The pneumatic clamps were then closed to clamp the bag in place, and to form a tight seal outside of the injector nozzle area. Air was injected into the bag, through the air injector nozzle. The internal pressure in the bag was increased until the contaminated seal ruptured. The burst pressure of the contaminated seal was recorded as the maximum pressure achieved prior to rupture.

The standard drop test failure rate was determined by injecting boneless pork sirloin pieces with a brine-based injection solution. The brine-based injection solution contained about 3 percent phosphate. The boneless pork sirloin pieces were injected with the brine solution in an amount of about 11 percent, based on the weight of the boneless sirloin pieces. About 4½ pounds of injected pork sirloin pieces were then placed in a test bag. The test bag was a tube of polymeric material having a factory seal applied to one end, and an open, unsealed end, having a lay-flat width of about 8 to 9½ inches, and a length of about 18 inches. The seal area of the bag was kept free of contamination by loading the meat into the bag using a loading horn. Then, the open end of the bag, or the seal area, was intentionally contaminated with about 5 to 6 milliliters of a brine/purge seal contamination solution. The solution was evenly dispersed onto the inside surface of the bag, in the area to be sealed.

The brine/purge seal contamination solution was prepared as follows: 500 milliliters of the brine solution, which was the same as the injection solution discussed above, was mixed with 500 milliliters of pork purge (i.e., blood) and 100 g of lean pork muscle. This mixture was then blended until uniformly liquefied, and was chilled to a temperature of from about 32° to 45° F. for at least 1 hour prior to use.

After the brine/purge seal contamination solution was applied to the seal area of the bag, the bag was heat sealed using a Cryovac® 8600-B18 rotary chamber vacuum packaging machine. While in the Cryovac® 8600-B18 rotary chamber vacuum packaging machine, the atmosphere within the bag was evacuated to a level of about 2-3 torr. While the bag was evacuated, it was closed around the product by heat sealing, the seal being made through that portion of the bag to which the brine/purge seal contamination solution had been applied. The sealing parameters were: a current of 76 amps, a seal time of 0.5 seconds, and a machine speed of 30 packages per minute. The seal was made at a distance of approximately 4 inches from the injected pork sirloin pieces. After sealing, the resulting package was shrunk in a Cryovac® BFT6570 E shrink tunnel, which operated with a water temperature of 195° F. and a belt speed of 55 feet per minute.

Five of the resulting packages were placed in a 15 inch wide, by 23.5 inch long, by 9 inch deep box, with the box material (corrugated paper board) being about ⅛ inch thick. The box containing the 5 packages was then dropped from a height of 34 inches onto a level, flat, hard surface, so that the bottom surface of the box landed flat on the hard surface.

After dropping, the five packages were removed from the box and two different failure modes were evaluated. First, any packages that were obviously leaking and had ruptured seals were recorded as Catastrophic Leaks. Secondly, the remaining, packages were tested for Slow Leaks by inflating the package with air, and submerging it in water. The presence of air bubbles coming from the seal indicated a Slow Leak. Standard drop test failure rates are reported as the sum of the percentage of Catastrophic Leaks and percentage of Slow Leaks, unless specifically indicated otherwise.

A total of 50 replications were conducted in order to establish the performance criteria, i.e., the failure rate, which was reported in terms of the percent of the bags which exhibited leaking at the seal. In conducting the replications, no box was used (i.e., dropped) more than three times. Moreover, the sirloin pieces were used no more than 5 times, i.e., no more than 5 replications. The sirloin pieces were maintained at a temperature of from about 32° F. to 45° F. Between each replication the sirloin pieces were submerged in the brine solution for a minimum of 5 minutes before repackaging. The temperature of the brine solution was maintained between 32° F. and 45° F.

The in-line processing test was performed by packaging actual liquid containing meat product, where the meat product was packaged in the same method as described in connection with the Standard Drop Test. In the In-Line Processing Test, however, the packages were inspected 24 hours after having been dropped, thereby yielding 24 Hour Leaks results. This delay period provided an opportunity for the brine solution to remain in contact with the seal, and to provide continuous mechanical stress and/or chemical attack on the contaminated seal. Further, packages were placed on a shipping truck, in various configurations, and transported for time period of approximately 4 to 5 days. The packages were then inspected for leaks in the contaminated seals, thereby yielding Shipping Leaks results.

"Control" or "standard" materials were always run when the test was performed, so that relative comparisons can be made within each testing session.

TABLE 4

| | Sealant | | | | Drop Test | | | |
|---|---|---|---|---|---|---|---|---|
| Ex. | Density (g/cc) | Melt Index (g/10 min) | Surface Modifying Additive | Contaminated Burst Pressure (psi) | Catastrophic Leaks (%) | Slow Leaks (%) | Total Leaks (%) | Surface Energy (dyne/cm) |
| 1 | 0.904 | 5.4 | Slip1 | 2.6 | 64 | 8 | 72 | 19.9 |
| 2 | 0.904 | 5.4 | Surf1 | 2.0 | | | | — |
| 3 | 0.904 | 5.4 | Surf2 (wet sock) | 2.4 | 28 | 22 | 60 | — |
| 4 | 0.904 | 5.4 | Surf3 (wet sock) | 2.4 | | | | — |
| A | 0.904 | 5.4 | None | 2.2 | 58 | 20 | 78 | 28.6 |

TABLE 5

| | Sealant | | | |
|---|---|---|---|---|
| Ex. | Density (g/cc) | Melt Index (g/10 min) | Surface Modifying Additive | Contaminated Burst Pressure (psi) |
| 6 | 0.910 | 5.2 | Surf2 (wet sock) | 1.6 |
| 7 | 0.916 | 4.9 | Surf2 (wet sock) | 1.4 |
| B | 0.904 | 5.4 | None | 1.5 |

TABLE 6

| | Sealant | | | |
|---|---|---|---|---|
| Ex. | Density (g/cc) | Melt Index (g/10 min) | Surface Modifying Additive | Contaminated Burst Pressure (psi) |
| 1 | 0.904 | 5.4 | Slip1 | 2.2 |
| C | 0.904 | 5.4 | None | 1.3 |

TABLE 7

| | Sealant | | | |
|---|---|---|---|---|
| Ex. | Density | Melt Index (g/10 min) | Surface Modifying Additive | Contaminated Burst Pressure (psi) |
| 3 | 0.904 | 5.4 | Surf2 (wet sock) | 1.8 |
| D | 0.904 | 5.4 | None | 0.6 |

TABLE 8

| | Sealant | | | |
|---|---|---|---|---|
| Ex. | Density | Melt Index (g/10 min) | Surface Modifying Additive | Contaminated Burst Pressure (psi) |
| 9 | 0.907 | 6.2 | Slip5 | 2.1 |
| E | 0.904 | 5.4 | None | 1.7 |

TABLE 9

| | Sealant | | | | |
|---|---|---|---|---|---|
| Ex. | Density | Melt Index (g/10 min) | Surface Modifying Additive | Contaminated Burst Pressure (psi) | Surface Energy (dynes/cm) |
| 10 | 0.911 | 6.2 | Slip5 | 2.0 | 19.2 |
| 11 | 0.906 | 6.1 | Slip5 | 2.0 | 19.9 |
| 12 | 0.903 | 6.1 | Slip5 | 2.3 | 20.5 |
| 13 | 0.901 | 6.0 | Slip5 | 1.9 | 24.4 |
| 14 | 0.879 | 6.2 | Slip5 | 1.9 | — |
| F | 0.904 | 5.4 | None | 1.7 | 29.6 |

TABLE 10

| | | Sealant | | |
|---|---|---|---|---|
| Ex. | Density | Melt Index (g/10 min) | Surface Modifying Additive | Contaminated Burst Pressure (psi) |
| 15 | 0.903 | 6.1 | Slip5 | 1.6 |
| G | 0.900 | 6.0 | None | 0.9 |

TABLE 11

| | | Sealant | | |
|---|---|---|---|---|
| Ex. | Density | Melt Index (g/10 min) | Surface Modifying Additive | Contaminated Burst Pressure (psi) |
| 16 | 0.903 | 6.0 | Slip1 | 1.9 |
| H | 0.904 | 5.4 | None | 1.0 |

Referring to Table 4, the sealability of Example 1 is believed to be due, at least in part, to the presence of a slip agent which lowers surface energy of the sealing layer. The low surface energy causes the contaminant liquid to bead up on the sealing layer and get more easily squashed out or eliminated during sealing, thereby allowing the sealants to come in more intimate contact and maximizes molecular entanglement during sealing. The higher contaminated burst pressure, reduced level of total leaks in the drop test, and lower surface energy than Comparative Example A, illustrate the improved sealability. The sealabilties of Examples 2-4 are believed to be due, at least in part, to the presence of surfactant in the sealing layer. Example 2 contained a surfactant that was semisolid at refrigeration and test temperatures, which limited the rate at which surfactant migrates out of the sealant. Accordingly, the sealability of Example 2 is expected to be further improved if a lower viscosity surfactant were to be used, and/or if the surfactant were to be compounded in a higher amount and/or if the surfactant were applied via a wet sock, spraying or coating process. Examples 3 and 4, where surfactant was applied as a wet sock, exhibited a highly wettable surface, causing the droplets of contaminant liquid to noticeably spread out and less thickness of contaminant resides in the seal area during heat sealing. Comparative Example A illustrates the reduced performance in contaminated burst pressure test and increased number of total leaks in the drop test when neither a slip agent nor a surfactant are present.

Referring to Table 5, Example 6, where surfactant was applied as a wet sock, exhibited a highly wettable surface, causing the droplets of contaminant liquid to spread out on the surface, resulting in less thickness of the contaminant residing in the seal area during heat sealing. In Example 7, the increased amount of the AB1 is believed to have roughened up the surface, thereby slightly reducing intimate contact between the layers and lowering the contaminated burst pressure as compared to Example 6. Comparative Example B illustrates the performance of a sealant when neither a slip agent nor a surfactant are present.

Referring to Table 6, the increased contaminated burst pressure of Example 1 is believed to be due, at least in part, to the presence of a slip agent which lowers surface energy of the sealing layer. The low surface energy causes the contaminant liquid to noticeably bead up on the sealing layer and get "squashed out" or eliminated during sealing, thereby allowing the sealants to come in more intimate contact and maximizes molecular entanglement during sealing. Comparative Example C shows the reduced performance in the contaminated burst test when the slip agent was not present to assist in the elimination of the contaminant.

Referring to Table 7, Example 3 exhibited a highly wettable surface, due to the presence of surfactant, which causes the droplets of contaminant liquid to noticeably spread out and less thickness of contaminant resides in the seal area during heat sealing. Comparative Example D shows the reduce performance in the contaminated burst test of a comparative packaging material where surfactant is not present.

Referring to Table 8, Example 9 again illustrated the effect of a slip agent on contaminated burst pressure, compared to Comparative Example E.

Referring to Table 9, Examples 10-14 also illustrate the effect of a slip agent in the seal layer on contaminated burst pressure. Varying levels of the slip agent were added, and in all cases, the contaminated burst pressure was higher than Comparative Example F. Surface energy measurements again illustrate the mechanism for this. The presence of the slip agent reduces the surface energy below the value in Comparative Example F, showing the reduced affinity of the sealant for the added liquid contaminant.

Referring to Table 10, Example 15 shows almost a two-fold increase in contaminated burst pressure when the slip agent is present in the film described in Table 1A, relative to the Comparative Example G.

Referring to Table 11, a similar increase of almost two-fold contaminated burst pressure is seen when the slip agent is present in the film described in Table 1B, relative to Comparative Example H.

Those skilled in the art will appreciate that numerous changes and modifications may be made to the preferred embodiments of the invention and that such changes and modifications may be made without departing from the spirit of the invention. It is therefore intended that the appended claims cover all equivalent variations as fall within the true scope and spirit of the invention.

What is claimed is:

1. A packaged product comprising:
   (A) a meat product having an added liquid thereon, the added liquid comprising brine;
   (B) a packaging article surrounding the meat product and the added liquid, with atmosphere having been evacuated from between the meat product and the packaging article, the packaging article comprising a film having a seal layer having an outer surface having a surfactant thereon in an amount of from about 0.5 to 500 micrograms per square inch to provide the ability to heat seal through contamination of said heat seal layer caused by said added liquid to reduce leaker rates compared to the leaker rates of packaging articles having heat seal layers that do not comprise the surfactant, and wherein the packaging article is made from an end-seal bag or a side-seal bag.

2. The packaged product according to claim 1, wherein the outer surface has the surfactant thereon in an amount of from about 1 to 250 micrograms per square inch.

3. The packaged product according to claim 1, wherein the outer surface has the surfactant thereon in an amount of from about 2 to 100 micrograms per square inch.

4. The packaged product according to claim 1, wherein the surfactant comprises a non-ionic surfactant.

5. The packaged product according to claim 4, wherein the surfactant comprises at least one member selected from the group consisting of sorbitan oleate and alkyl-phenol.

6. The packaged product according to claim 1, wherein the seal layer contains a heterogeneous ethylene/alpha-olefin copolymer having a density of from about 0.85 to 0.95 g/cc.

7. The packaged product according to claim 6, wherein the heterogeneous ethylene/alpha-olefin copolymer has a melt index of from about 0.1 g/10 min to about 10 g/10 min.

8. The packaged product according to claim 1, wherein the seal layer contains a homogeneous ethylene/alpha-olefin copolymer having a density of from about 0.85 to 0.95 g/cc.

9. The packaged product according to claim 8, wherein the homogeneous ethylene/alpha-olefin copolymer has a melt index of from about 0.1 g/10 min to about 10 g/10 min.

10. The packaged product according to claim 1, wherein the seal layer is free of antiblock particulates on the surface thereof.

11. The packaged product according to claim 1, wherein the film has a total free shrink of from 10 to about 150 percent at 185° F.

12. The packaged product according to claim 1, wherein the film has a total free shrink of less than 10 percent at 185° F.

13. The packaged product according to claim 1, wherein the film has a thickness of from about 0.1 to 20 mils.

14. The packaged product according to claim 1, wherein the meat comprises at least one member selected from the group consisting of pork and beef.

15. The packaged product according to claim 1, wherein the added liquid is present in an amount of from about 1 percent to 50 percent, based on the weight of the product.

16. The packaged product according to claim 1, wherein the seal layer comprises at least one member selected from the group consisting of polyolefin, polyamide, polyester, polyvinyl chloride, and ionomer.

17. The packaged product according to claim 1, wherein the product comprises brine-injected fresh meat, and the packaging article comprises a film which has been shrunk against the fresh meat.

18. The packaged product according to claim 1, wherein the seal layer further comprises an antiblocking agent.

19. The packaged product according to claim 18, wherein the antiblocking agent comprises at least one member selected from the group consisting of corn starch, potato starch, and tapioca starch.

20. A packaged product comprising:
(A) a meat product having an added liquid thereon, the added liquid comprising brine;
(B) a packaging article surrounding the meat product and the added liquid, with atmosphere having been evacuated from between the meat product and the packaging article, the packaging article comprising a sheet having a seal layer, the sheet having a thickness of from about 5 to 600 mils, the seal layer having an outer surface having a surfactant thereon in an amount of from about 0.5 to 500 micrograms per square inch to reduce leaker rates compared to the leaker rate of a packaged product having heat seal layers that do not comprise the surfactant.

21. The packaged product according to claim 20, wherein the sheet is a rigid non-foam sheet having a thickness of from about 10 to 60 mils.

22. The packaged product according to claim 20, wherein the sheet is a foam sheet having a thickness of from about 50 to 400 mils.

* * * * *